(12) United States Patent
Power

(10) Patent No.: US 11,097,382 B2
(45) Date of Patent: Aug. 24, 2021

(54) MAGNETIC SCREENS AND CURTAINS FOR WELDING AND GRINDING

(71) Applicant: Thomas Power, St. John's (CA)

(72) Inventor: Thomas Power, St. John's (CA)

( * ) Notice: Subject to any disclaimer, the term of this patent is extended or adjusted under 35 U.S.C. 154(b) by 745 days.

(21) Appl. No.: 15/361,114

(22) Filed: Nov. 25, 2016

(65) Prior Publication Data

US 2017/0136588 A1    May 18, 2017

Related U.S. Application Data

(63) Continuation of application No. PCT/CA2015/050574, filed on Jun. 22, 2015.

(60) Provisional application No. 62/014,854, filed on Jun. 20, 2014.

(51) Int. Cl.
| | | |
|---|---|---|
| *B23K 37/00* | (2006.01) | |
| *B08B 15/00* | (2006.01) | |
| *F16P 1/06* | (2006.01) | |
| *B23K 9/32* | (2006.01) | |

(52) U.S. Cl.
CPC .............. *B23K 37/00* (2013.01); *B08B 15/00* (2013.01); *B23K 9/321* (2013.01); *B23K 37/006* (2013.01); *F16P 1/06* (2013.01)

(58) Field of Classification Search
CPC ......... F16P 1/06; B23K 37/00; B23K 37/006; B23K 9/321; B08B 15/00
USPC .............................. 160/351; 451/455; 228/59
See application file for complete search history.

(56) References Cited

U.S. PATENT DOCUMENTS

| | | | | | |
|---|---|---|---|---|---|
| 2,325,506 A | * | 7/1943 | Grace | ...................... | A61F 9/06 109/82 |
| 2,335,274 A | * | 11/1943 | Hampton | .................. | B23K 5/22 135/119 |
| 2,401,056 A | * | 5/1946 | Dilley | .................... | B23Q 11/08 160/351 |
| 2,410,306 A | * | 10/1946 | Romberg | .................. | A61F 9/06 109/49.5 |
| 2,911,038 A | * | 11/1959 | Frommelt | ................. | A61F 9/06 160/351 |
| 3,190,300 A | * | 6/1965 | Wear'N | ................ | E04H 15/003 135/126 |
| 3,477,492 A | * | 11/1969 | Suess | ........................ | E06B 9/52 160/135 |
| 3,568,567 A | * | 3/1971 | Seek | ................... | B23Q 11/0866 409/134 |

(Continued)

FOREIGN PATENT DOCUMENTS

WO    2012136979 A1    11/2012

OTHER PUBLICATIONS

Document relating to International Application No. PCT/CA2015/050574. International Search Report, dated Sep. 3, 2015.

*Primary Examiner* — Johnnie A. Shablack
(74) *Attorney, Agent, or Firm* — Bereskin & Parr LLP

(57) ABSTRACT

A welding screen includes a primary barrier made of a magnetic sheet. The welding screen enhances safety by halting or restricting the motion of magnetic and paramagnetic by-products, thereby preventing flame, light, magnetic material, sparks and dust from being scattered during welding or post-weld grinding. This improvement can be applied to various type of welding screens (welding curtain, welding windshield), by using a flexible magnetic sheet material as the primary barrier material.

6 Claims, 4 Drawing Sheets

(56) References Cited

U.S. PATENT DOCUMENTS

| | | | | |
|---|---|---|---|---|
| 3,713,474 A * | 1/1973 | Orlando | E04B 2/7409 | 160/351 |
| 3,768,222 A * | 10/1973 | Birum, Jr. | A47G 5/00 | 160/135 |
| 3,824,927 A * | 7/1974 | Pugh | B41F 27/02 | 101/378 |
| 3,889,736 A * | 6/1975 | Firks | A47G 5/00 | 16/225 |
| 4,085,789 A * | 4/1978 | Steiner | A47G 5/00 | 160/135 |
| 4,108,548 A * | 8/1978 | Hawkins | G03B 27/582 | 355/54 |
| 4,134,439 A * | 1/1979 | Scott | A47G 5/00 | 160/135 |
| 4,242,823 A * | 1/1981 | Bruno | G09F 7/04 | 40/124 |
| 4,330,177 A * | 5/1982 | Miller | A61F 9/065 | 351/44 |
| 4,475,249 A * | 10/1984 | Golay | A61F 9/06 | 2/11 |
| 4,480,894 A * | 11/1984 | Miller | A61F 9/06 | 359/350 |
| 4,842,035 A * | 6/1989 | Thompson | E04B 2/7431 | 160/135 |
| D302,830 S * | 8/1989 | Popat | D19/26 | |
| 4,953,442 A * | 9/1990 | Bartuski | B32B 13/14 | 89/36.02 |
| 5,006,000 A * | 4/1991 | House | G09B 1/08 | 434/161 |
| 5,012,852 A * | 5/1991 | Blackhurst | A61G 15/10 | 160/351 |
| 5,056,969 A * | 10/1991 | Nerland | B23Q 1/0063 | 29/DIG. 94 |
| 5,269,524 A * | 12/1993 | Womack | A63F 3/0023 | 273/157 R |
| 5,699,631 A * | 12/1997 | Tyson | G09F 7/04 | 40/493 |
| 5,930,927 A * | 8/1999 | Griffin | G09F 7/04 | 160/10 |
| 6,048,601 A * | 4/2000 | Yahagi | C22C 33/0278 | 428/147 |
| 6,098,207 A * | 8/2000 | Burtin | A61F 9/029 | 2/431 |
| 6,206,079 B1 * | 3/2001 | Selgrad | A47G 5/00 | 160/135 |
| 6,308,446 B1 * | 10/2001 | Healy | G09F 7/04 | 40/600 |
| 6,581,667 B2 * | 6/2003 | Waring | B65D 90/00 | 160/351 |
| 6,749,750 B2 * | 6/2004 | Barbera-Guillem | B03C 1/288 | 210/222 |
| 6,783,798 B2 * | 8/2004 | Koslow | B32B 5/16 | 148/105 |
| 6,872,325 B2 * | 3/2005 | Bandyopadhyay | B29C 39/003 | 252/62.54 |
| 7,040,899 B2 * | 5/2006 | Armstrong | A47F 7/14 | 160/135 |
| 7,131,801 B2 * | 11/2006 | Azema | B23Q 11/085 | 409/134 |
| 7,741,642 B2 * | 6/2010 | Takayama | H01L 27/1214 | 257/59 |
| 7,900,845 B2 * | 3/2011 | Stagg | B42D 15/006 | 235/493 |
| 8,347,481 B1 * | 1/2013 | Crenshaw | B23K 9/0286 | 29/525.14 |
| 8,985,182 B2 * | 3/2015 | Fredin | B23K 9/321 | 160/351 |
| 9,097,386 B2 * | 8/2015 | Phillips | B23K 9/321 | |
| 2002/0160231 A1 * | 10/2002 | Schneider | G11B 5/70 | 428/843 |
| 2003/0080231 A1 * | 5/2003 | Lowder | B43L 1/008 | 242/385.1 |
| 2005/0055921 A1 * | 3/2005 | Vella | E06B 3/7001 | 52/311.1 |
| 2005/0076591 A1 * | 4/2005 | Koeller | B44C 1/18 | 52/311.1 |
| 2005/0262787 A1 * | 12/2005 | Goss | B44C 5/0461 | 52/311.1 |
| 2006/0131811 A1 * | 6/2006 | Satomi | F41J 3/0057 | 273/348.3 |
| 2006/0165880 A1 * | 7/2006 | Boudouris | H01F 1/0027 | 427/127 |
| 2008/0164688 A1 * | 7/2008 | Huff | B42F 9/002 | 281/45 |
| 2008/0169403 A1 * | 7/2008 | Rooney | G03B 21/58 | 248/343 |
| 2009/0008047 A1 * | 1/2009 | Mayworm | E01F 7/045 | 160/351 |
| 2009/0134963 A1 * | 5/2009 | Ogden, Jr. | H01F 1/117 | 335/297 |
| 2009/0211123 A1 * | 8/2009 | Arnold | B43L 1/00 | 40/1 |
| 2009/0263634 A1 * | 10/2009 | Hyer | E04F 13/002 | 428/195.1 |
| 2010/0011641 A1 * | 1/2010 | Hill | G09F 15/02 | 40/606.12 |
| 2010/0326609 A1 * | 12/2010 | Sheridan | B60J 11/04 | 160/370.21 |
| 2012/0247693 A1 * | 10/2012 | Hill | G09F 1/10 | 160/368.1 |
| 2013/0087292 A1 | 4/2013 | Gould | | |
| 2013/0092331 A1 * | 4/2013 | Johnsen | E06B 7/30 | 160/351 |
| 2013/0092332 A1 * | 4/2013 | Johnsen | E06B 7/30 | 160/368.1 |
| 2013/0092335 A1 * | 4/2013 | Johnsen | E06B 7/30 | 160/405 |
| 2013/0180674 A1 * | 7/2013 | Fredin | B23K 9/321 | 160/351 |
| 2014/0020855 A1 * | 1/2014 | Phillips | B23K 37/006 | 160/351 |
| 2016/0346904 A1 * | 12/2016 | Marshall | B25B 11/002 | |
| 2019/0105740 A1 * | 4/2019 | Vanier | G02B 5/208 | |

* cited by examiner

MAGNETIC SCREENS AND CURTAINS FOR WELDING AND GRINDING

FIELD

The present disclosure relates to devices used to protect persons and property in the vicinity of welding and grinding operations, and the use of screens, curtains or shields for this purposes.

BACKGROUND

Welding is a dangerous industrial activity which requires specialized devices to protect both the persons engaged in the activity, as well as other workers on a project site in the vicinity of welding activity. Welding sparks, slag materials, metallic dust, and metallic shards, are often expelled from a weld site during a weld or during post weld grinding. Wind near the site may also debris to blow back against the welding or affect the quality of the weld. The light produced by welding itself is a hazard. To protect themselves against the dangerous byproducts of welding, welders wear protective clothing. However, bystanders near the welder's workspace may be exposed to the same byproducts of welding as welders, often without the advantage of protective clothing. Moreover, welding byproducts pose a general threat to property. For example, superheated particulate matter could damage nearby property or cause fire, and when cooled, the particulate and dust needs to be cleared.

Various different sizes and shapes of screens have been used to fulfil this purpose, and are typically configured as a frame bearing a protective translucent or opaque screen or curtain material, which meets standards to ensure it is sufficiently flame resistant, UV resistant & abrasion resistant and durable. The welding screen can be set or even detachably attached to a work area. Under various embodiments, these devices are referred to as, among other names, welding shields, welding windshields, welding curtains, welding screens, and the like. As discussed herein, the term welding screen is meant to include curtains, screens, windshields and similar devices adapted to protect the welding workspace from disturbance and to restrict (to the extent practical) the welding materials from escaping the workspace.

However, in many instances, the sheet plastic that tends to be used is easily melted and frequent replacement is required.

There is a need for a safer welding screen.

There is a need for a welding screen that assists in maintaining the cleanliness of the welding work space and lessens the concern that melding slag will ricochet.

There is a need for a welding screen of more resilient materials not normally used for this purpose, which resists melting.

There is a need for a replacement welding screen material of improved safety performance.

SUMMARY

Welding screens in which the barrier portion includes magnetic sheeting material as a primary component, attract and restrict the motion of magnetic and paramagnetic materials, including iron, cobalt and nickel dust, metal shards, slag and other waste materials extruded during a welding operation susceptible to magnet fields. Once adhered to the magnetic surface of the portion of the screen formed using the magnetic sheeting material; dust, metal shards and ferromagnetic debris ("magnetic waste") are restricted from rebounding or being blown around. The screen can be advantageously used to clean the work environment as it attracts retains the magnetic waste. In an optional embodiment, a smooth exterior to the magnetic sheeting material allows the ferromagnetic waste to be wiped along its surface for cleaning, or removed using a stronger magnet.

Instead of magnetic sheeting materials using permanent magnets embedded within a resin, in another embodiment, the welding screen may comprise one or more electromagnets to create an electro-magnetic field attracting magnetic waste into a barrier within the magnetic field. In such an embodiment, the barrier may comprise magnetic materials to assist in strengthening the field wherein a current is passed through the windings of the electromagnet.

DETAILED DESCRIPTION

One or more preferred embodiments of the magnetic welding screen of the present disclosure will now be described in greater detail with reference to the accompanying drawings.

Figure 1:
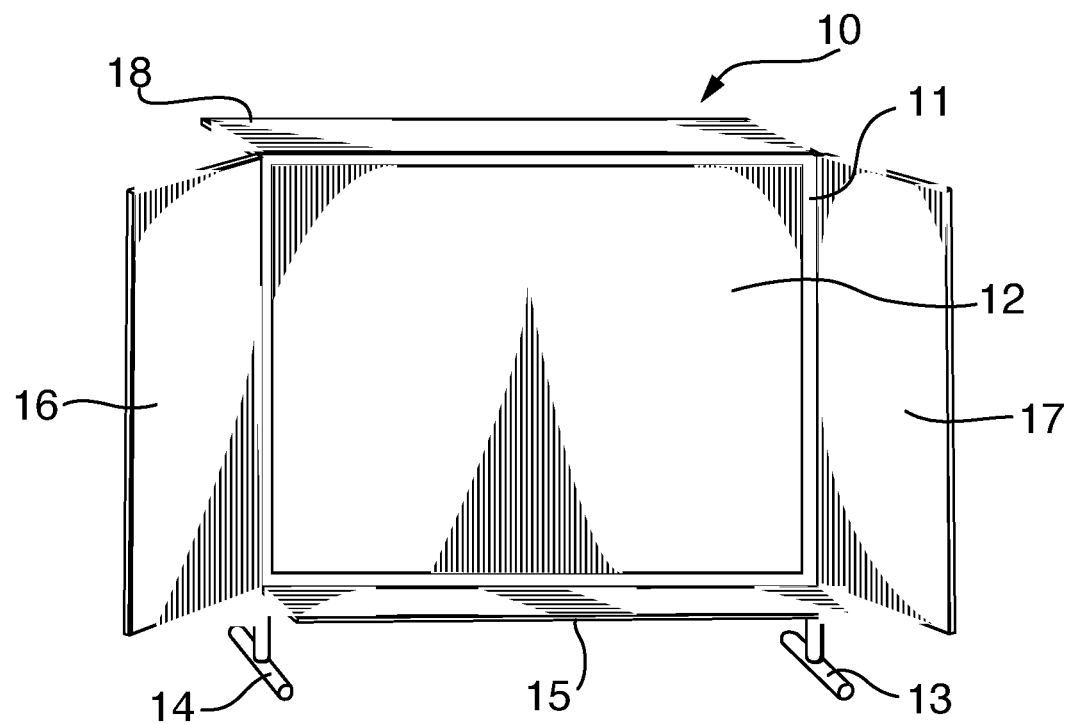
FIG. 1 shows a perspective view of one embodiment of a magnetic welding screen.

FIG. 1 shows a magnetic welding screen 10 having a frame 11 to support a primary barrier 12 comprised of ferromagnetic sheeting material and is provided with support elements 13 and 14. Optional flexible edge barriers 15, 16 and 17 are secondary barriers which may be used to improve the fit of the magnetic welding screen 10 to the work space, floor or walls. An optional adjustable roof barrier 18 may also be provided as a secondary barrier. Where the optional flexible edge barriers 15, 16 and 17 and optional adjustable roof barrier 18 are also be formed of flexible ferromagnetic sheeting material, they may be used to connect the welding screen to other welding screens 10 or to other different welding screens having polls of a suitable material. This option has the dual function of allowing the device to be affixed to a ferromagnetic workspace (e.g. girders in a tower, or ship hull in marine manufacture, etc.) to both keep the magnetic welding screen 10 in position and to create an improved seal against ferromagnetic waste and other waste, or air currents, escaping or entering the work space.

The ferromagnetic sheeting material can be of various commercially available types, usually formed using of magnetic particles/powders embedded within a resin, rubber and/or plastic layer (referred generally as a polymer bonded magnets). New magnetic sheeting material is created, but the use of any magnetic sheeting material for the purpose of the primary barrier in a welding screen should be considered within the scope of the present disclosure. Flexible magnetic sheeting is typically used as signage or labelling which can be adhered to ferrous metal surfaces; but is not known to be used to as primary material in a welding screen to protect against welding byproducts.

While flexible magnets tend to have much less magnetic pull than neodymium & ceramic magnets, they are also much less expensive, and provide sufficient attraction forces to slow ferrous metals and prevent rebound of particles. In the prototype discussed below, the magnets are based on strontium ferrite powder ($SrFe_{12}O_{19}$) and having approximate maximum energy $BH_{max}$ of between 5000 J/m$^3$ and 6000 J/m$^3$, isotropic, as deposited in rubber substrate normally used for refrigerator magnets or automotive decoration applications. Other ferromagnetic powders, including anisotropic ones, can be used, including barium ferrite powder, magnesium zinc powder and nickel zinc powder, embedded and oriented within a flexible rubber or plastic matrix; and these may achieve higher maximum energies. A person of skill in the art will appreciate that various magnetic powders could be used, including, without limitation, those in the group consisting of any rare earth ferrous oxide permanent magnet powders, rare earth iron boron permanent magnet powders, Samarium Iron Nitride permanent magnet powders, Magnesium Zinc permanent magnet powders, Nickel Zinc permanent magnet powders and strontium ferrite powders. This can be bonded into a suitable polymer sheet.

Figure 2:
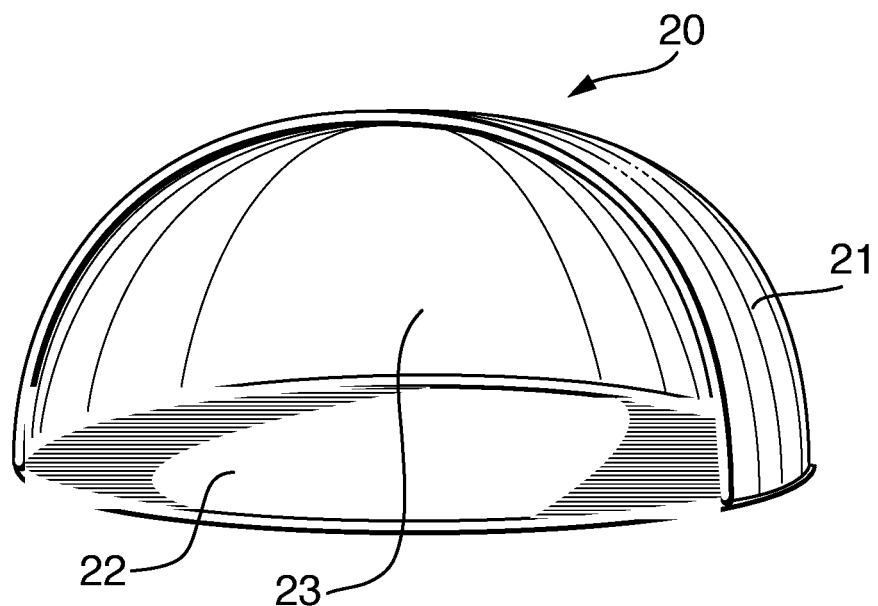
FIG. 2 shows a perspective view of a second embodiment of a flexible magnetic sheet configured as a free standing magnetic welding screen.

FIG. 2 shows a second embodiment of a self standing magnetic welding screen 20 formed in a dome configuration, having a shell 21 of flexible magnetic sheeting, affixed to a base 22, to define a safe workspace within a cavity 23. The welding screen 20 may be viewed as a portable free standing welding splatter protection device comprising a partial dome of flexible magnetic sheeting 21 affixed to a rigid base 22, the flexible magnetic sheeting to magnetically attract and collect welding and grinding byproducts from passing beyond a cavity 23 in which a welding job is performed.

Figure 3:
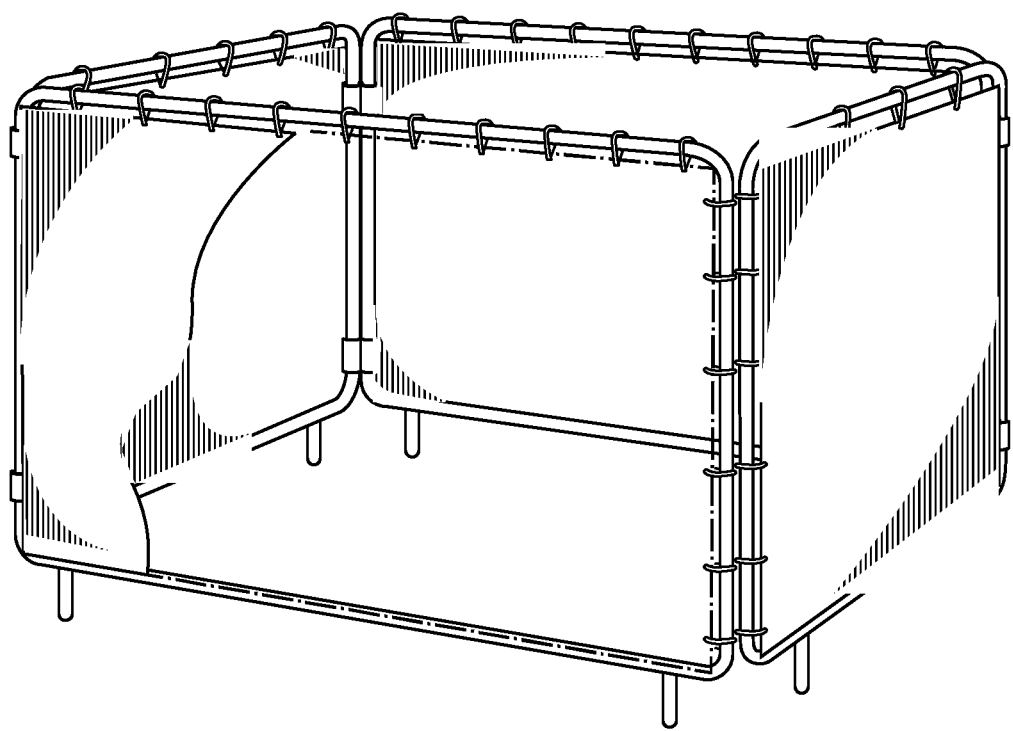
FIG. 3 shows a perspective view of a configuration of four joined welding screens of magnetic material about a workspace.
Figure 4A:
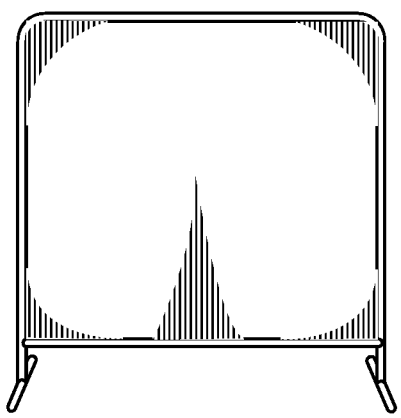
FIGS. 4A-4D show views of 4 configurations of joined welding screens of magnetic material.
Figure 4B:
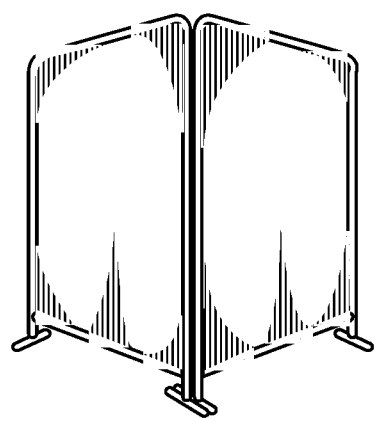
Figure 4C:
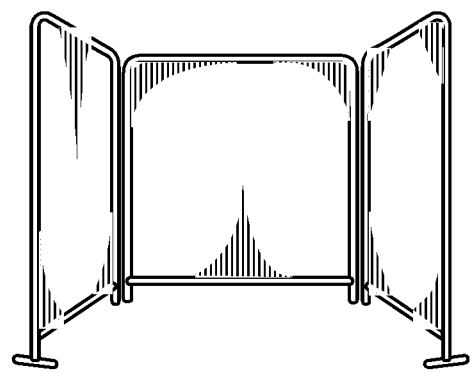
Figure 4D:
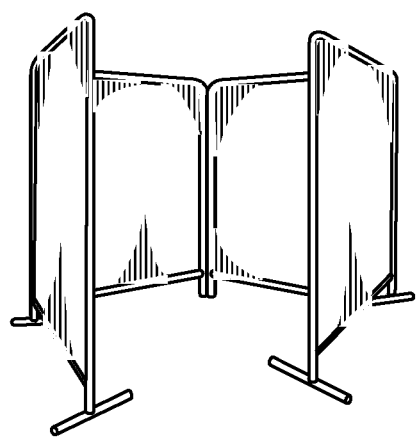

FIG. 3 shows a configuration of four joined welding screens about a workspace. By replacing existing curtain/barrier material on existing welding screens, they can be refurbished. This is often required as existing materials burn and degrade easily. An existing curtain or barrier of appropriate size may be used as a template to permit the creation of a flexible magnetic sheet of similar size, dimensions and attachment locations (holes, buttons etc., if required) so that a flexible magnetic sheet may be cut and used as a replacement barrier on existing welding screen frames.

FIGS. 4A-4D show views of 4 configurations of joined welding screens of magnetic material, which can be joined using flaps of flexible magnetic sheeting material where the screen abut.

Figure 5:
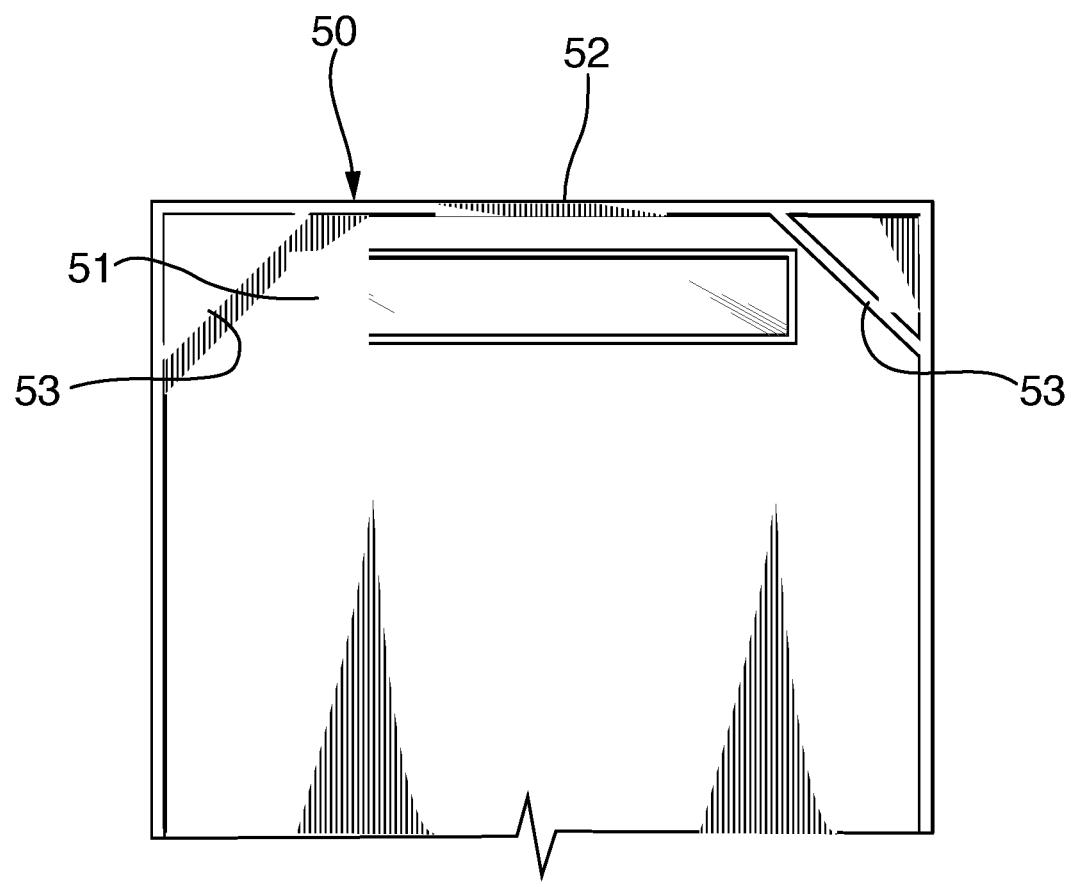
FIG. 5 shows a prototype welding screen used in testing in which the magnetic sheet material used was 0.76 mm (0.03 inches) thick, using strontium ferrite powder ($SrFe_{12}O_{19}$) as the permanent magnetic powder bonded within the flexible polymer sheet and having approximate maximum energy $BH_{max}$ of between 5000 J/m$^3$ and 6000 J/m$^3$.

FIG. 5 shows a prototype magnetic welding screen 50 comprised of a rubber magnetic sheet, in which strontium ferrite powder ($SrFe_{12}O_{19}$) is the bonded magnetic material. The specifications of the magnet provided a thickness of 0.7 mm (0.03 inches) and the magnet provided approximate maximum energy $BH_{max}$ of between 5000 J/m$^3$ and 6000 J/m$^3$, and such materials are readily available in the market place for use in other contexts, but not as welding shields. As the material is opaque, magnetic welding screen 50 may also have a transparent window 51 to permit viewing into the welding area. In the prototype, the frame 52 was also provided with support struts 53. These would not be required in all instances where the magnetic welding screen 50 of the present invention is used; but provide a convenient way to connect the screen 50 to the frame 52, and where the struts 53 are themselves magnetic, may provide a useful improvement to frames with which this type of screen are used.

In the pilot using the prototypes, six screens were deployed for use in an industrial environment for a 10 month period. During this time, none of the screens exhibited any damages due to melting—unlike the other standard plastic screens, virtually all of which showed significant melting damage.

The welding curtain is positioned to protect the vicinity from welding byproducts, including light from the welding and metallic projectiles and sparks from the grinding step. The curtains are not affixed to the materials being welded themselves.

The foregoing examples and advantages are merely exemplary and are not to be construed as limiting the present disclosure. The present teaching can be readily applied to other types of devices. Also, the description of the examples of the welding shield/screen/curtain/windshield is intended to be illustrative, and not to limit the scope of the claims, and many alternatives, modifications, and variations will be apparent to those skilled in the art.

The invention claimed is:
1. A welding screen comprising:
a primary barrier, the primary barrier made of magnetic sheet, wherein the magnetic sheet is flexible;
a frame on a stand to maintain the primary barrier in place, wherein the primary barrier is affixed within the frame; and
at least one secondary barrier made of magnetic sheet, wherein the secondary barrier is affixed to the outside of the frame for detachable attachment to magnetic materials in a workspace or adjacent welding screens.
2. The welding screen of claim 1 wherein the magnetic sheet is a polymer bonded sheet having embedded permanent magnet powders.
3. The welding screen of claim 2 wherein the permanent magnet powders are selected from a group of permanent magnet powders consisting of: rare earth ferrous oxide permanent magnet powders, rare earth iron boron permanent magnet powders, Samarium Iron Nitride permanent magnet powders, Magnesium Zinc permanent magnet powders, Nickel Zinc permanent magnet powders and strontium ferrite powder.
4. A welding screen comprising:
a primary barrier, the primary barrier made of magnetic sheet, wherein the magnetic sheet is flexible;
a frame on a stand to maintain the primary barrier in place, wherein the primary barrier is affixed within the frame; and
at least one window region within the primary barrier, the at least one window region made of heat resistant, transparent polymer sheet.
5. The welding screen of claim 4 wherein the primary barrier is a replaceable curtain of size adapted to fit within the frame.
6. A portable free standing welding splatter protection device comprising a partial dome of flexible magnetic sheeting affixed to a rigid base, the flexible magnetic sheeting to magnetically attract and collect welding and grinding byproducts.

* * * * *